(12) United States Patent
Vaez-Iravani et al.

(10) Patent No.: US 12,288,350 B2
(45) Date of Patent: Apr. 29, 2025

(54) IMAGE BASED METROLOGY OF SURFACE DEFORMATIONS

(71) Applicant: Applied Materials, Inc., Santa Clara, CA (US)

(72) Inventors: Mehdi Vaez-Iravani, Los Gatos, CA (US); Guoheng Zhao, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 374 days.

(21) Appl. No.: 17/852,013

(22) Filed: Jun. 28, 2022

(65) Prior Publication Data

US 2022/0327725 A1 Oct. 13, 2022

Related U.S. Application Data

(62) Division of application No. 16/877,866, filed on May 19, 2020, now Pat. No. 11,417,010.

(51) Int. Cl.
*G06T 7/68* (2017.01)
*G06T 7/00* (2017.01)

(52) U.S. Cl.
CPC ............... *G06T 7/68* (2017.01); *G06T 7/001* (2013.01); *G06T 2207/30148* (2013.01)

(58) Field of Classification Search
CPC . G06T 7/68; G06T 7/001; G06T 2207/30148; G06T 2207/10016; G06T 7/73; G06T 7/0006; G06T 7/13; G06T 7/70; G06T 7/0004; G01N 2021/8822; G01N 21/9501; G01N 2021/95676; G01N 21/8806; G01N 21/55; H01L 22/12
See application file for complete search history.

(56) References Cited

U.S. PATENT DOCUMENTS

| | | | |
|---|---|---|---|
| 5,166,755 A | 11/1992 | Gat | |
| 6,437,862 B1 | 8/2002 | Miyazaki et al. | |
| 6,608,689 B1 * | 8/2003 | Wei | G01B 11/16 250/559.27 |
| 7,286,242 B2 | 10/2007 | Kim et al. | |

(Continued)

FOREIGN PATENT DOCUMENTS

| | | |
|---|---|---|
| CN | 101755187 B | 6/2012 |
| EP | 3 428 572 A1 | 1/2019 |

(Continued)

OTHER PUBLICATIONS

International Preliminary Report on Patentability for Application No. PCT/US2021/022169, mailed Oct. 6, 2022, 6 pages.

(Continued)

*Primary Examiner* — Amara Abdi
(74) *Attorney, Agent, or Firm* — Kilpatrick Townsend & Stockton LLP

(57) ABSTRACT

Methods for detecting areas of localized tilt on a sample using imaging reflectometry measurements include obtaining a first image without blocking any light reflected from the sample and obtaining a second image while blocking some light reflected from the sample at the aperture plane. The areas of localized tilt are detected by comparing first reflectance intensity values of pixels in the first image with second reflectance intensity values of corresponding pixels in the second image.

4 Claims, 14 Drawing Sheets

(56) References Cited

U.S. PATENT DOCUMENTS

| | | | |
|---|---|---|---|
| 10,816,464 B2 | 10/2020 | Zhao et al. | |
| 11,150,078 B1 | 10/2021 | Zhao et al. | |
| 11,156,566 B2 | 10/2021 | Zhao et al. | |
| 11,187,654 B2 | 11/2021 | Zhao et al. | |
| 11,417,010 B2 | 8/2022 | Vaez-Iravani et al. | |
| 2004/0169861 A1 | 9/2004 | Mieher et al. | |
| 2004/0227948 A1 | 11/2004 | Debevec et al. | |
| 2004/0246493 A1* | 12/2004 | Kim | G01B 11/0625 356/504 |
| 2005/0206907 A1 | 9/2005 | Fujimoto et al. | |
| 2006/0063262 A1 | 3/2006 | Sopori | |
| 2006/0109475 A1 | 5/2006 | Misener et al. | |
| 2006/0289789 A1* | 12/2006 | Raymond | G01N 21/47 250/459.1 |
| 2009/0213328 A1 | 8/2009 | Isobe et al. | |
| 2009/0219518 A1 | 9/2009 | Baldwin et al. | |
| 2013/0063719 A1* | 3/2013 | Morris | G01N 21/211 356/121 |
| 2015/0043006 A1 | 2/2015 | de Groot | |
| 2015/0300809 A1 | 10/2015 | Kononchuk et al. | |
| 2016/0123894 A1* | 5/2016 | Fu | G01B 11/0616 356/615 |
| 2017/0221676 A1* | 8/2017 | Sunaoshi | H01J 37/28 |
| 2018/0073865 A1* | 3/2018 | Suzuki | G02B 21/0088 |
| 2018/0252514 A1* | 9/2018 | Pandev | G03F 7/705 |
| 2018/0372636 A1* | 12/2018 | Sofue | G01N 21/64 |
| 2019/0041198 A1* | 2/2019 | Suzuki | G02B 21/086 |
| 2019/0265024 A1* | 8/2019 | Odaira | G01B 9/04 |
| 2019/0302010 A1 | 10/2019 | Porter et al. | |
| 2019/0391088 A1 | 12/2019 | Lynch | |
| 2020/0025678 A1* | 1/2020 | Rapaport | G01B 11/0641 |
| 2020/0232916 A1* | 7/2020 | Zhao | G01N 21/55 |
| 2021/0366143 A1 | 11/2021 | Vaez-Iravani et al. | |

FOREIGN PATENT DOCUMENTS

| | | |
|---|---|---|
| JP | 2005274156 A | 10/2005 |
| JP | 2019-158351 A | 9/2019 |
| KR | 10-2011-0089486 A | 8/2011 |
| KR | 10-1537854 B1 | 7/2015 |
| KR | 20160129728 A | 11/2016 |
| KR | 20180101604 A | 9/2018 |
| KR | 20190053280 A | 5/2019 |
| TW | 201732270 A | 9/2017 |
| TW | 201827785 A | 8/2018 |
| TW | 201937152 A | 9/2019 |
| TW | 201940833 A | 10/2019 |
| TW | 202004934 A | 1/2020 |
| WO | 2013/181156 A1 | 12/2013 |
| WO | 2016/020925 A1 | 2/2016 |
| WO | 2016/070155 A1 | 5/2016 |

OTHER PUBLICATIONS

International Preliminary Report on Patentability for Application No. PCT/US2021/022174, mailed Oct. 6, 2022, 7 pages.
U.S. Appl. No. 16/295,173 Notice of Allowance mailed Jul. 16, 2020, 9 pages.
International Search Report and Written Opinion for Application No. PCT/US2020/013185, mailed May 8, 2020, 12 pages.
U.S. Appl. No. 16/831,575 Non-Final Office Action mailed Mar. 2, 2021, 13 pages.
U.S. Appl. No. 16/831,643 First Action Interview Pilot Program Pre-Interview Communication mailed May 5, 2021, 4 pages.
U.S. Appl. No. 16/831,643 Notice of Allowance mailed Jun. 25, 2021, 10 pages.
International Search Report and Written Opinion for Application No. PCT/US2021/022169, mailed Jun. 28, 2021, 9 pages.
International Search Report and Written Opinion for Application No. PCT/US2021/022174, mailed Jul. 1, 2021, 11 pages.
U.S. Appl. No. 16/831,575 Notice of Allowance mailed Jul. 15, 2021, 8 pages.
U.S. Appl. No. 16/831,643 Corrected Notice of Allowability mailed Sep. 10, 2021, 5 pages.
U.S. Appl. No. 16/944,946 Notice of Allowance mailed Sep. 22, 2021, 8 pages.
U.S. Appl. No. 16/831,575 Corrected Notice of Allowability mailed Oct. 1, 2021, 5 pages.
U.S. Appl. No. 16/877,866 Restriction Requirement mailed Feb. 9, 2022, 6 pages.
U.S. Appl. No. 16/877,866 Notice of Allowance mailed Apr. 12, 2022, 9 pages.
PCT/US2020/013185 , "International Preliminary Report on Patentability", Aug. 5, 2021, 9 pages.

* cited by examiner

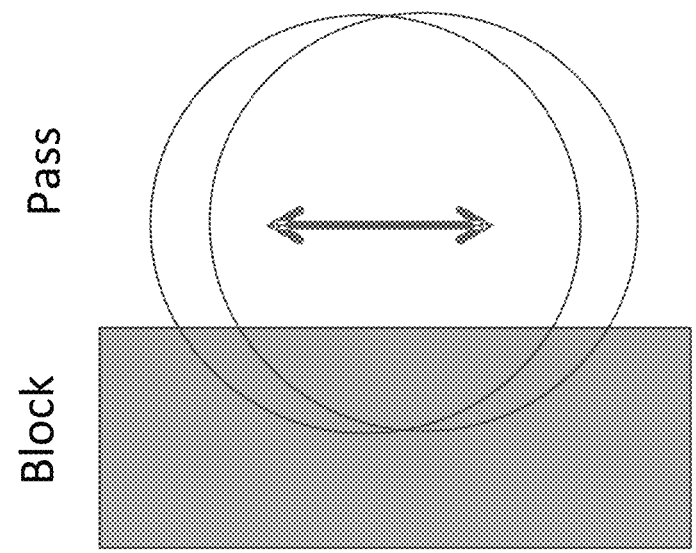
FIG. 7A
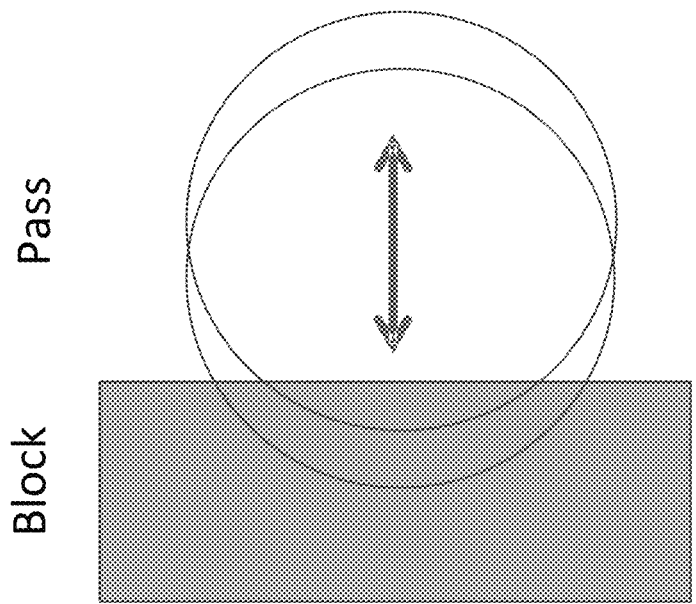
FIG. 7B
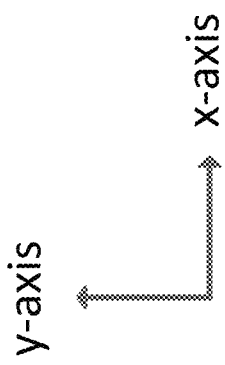

Illumination Pupil y-axis
x-axis

Imaging Pupil

IMAGE BASED METROLOGY OF SURFACE DEFORMATIONS

CROSS-REFERENCES TO RELATED APPLICATIONS

This application is a division of U.S. application Ser. No. 16/877,866, filed May 19, 2020, the entire contents of which are incorporated herein by reference in its entirety for all purposes.

FIELD

Embodiments described herein relate generally to mapping sample shape and/or detecting areas of localized tilt on a sample using image based metrology measurements.

BACKGROUND

Deposition of thin films on samples such as semiconductor wafers often leads to generation of local stress. If left untreated, a given stress profile can distort a sample shape, often in the form of a two-dimensional warping, sometime referred to as "potato chipping". Although in some subsequent processing steps a sample can be chucked, which can flatten the sample and reduce warp, a certain amount of uncorrected residual displacement may remain. This can lead to unacceptable errors in processes such as photolithography.

A map of the sample shape can be used to tune subsequent processes in an effort to reduce or correct the deformation. It is preferable that such a mapping technique be integrated into a processing tool. As such, it is desirable that a metrology solution be robust, reliable, and relatively inexpensive.

Current approaches to providing information on sample shape include whole-field sample interferometers, multi-spot local slope metrology, and shearing interferometry of an entire sample using large gratings. Multi-spot approaches suffer from a lack of continuity in the mapping, and whole-field interferometric systems are complex and expensive. In addition, such systems are typically designed to perform only one function, namely, to detect surface deformation without providing any accompanying information such as images or any pattern characteristics. Indeed, many existing methods for determining sample shape or topography often have difficulty operating on a patterned sample.

Thus, improved techniques for mapping sample shape and topographic variations resulting in local tilt or warp are desired.

SUMMARY

Embodiments described herein provide improved methods for mapping sample shape and detecting areas of localized tilt or warp on a sample. The various embodiments utilize image based reflectometry measurements, but it should be appreciated that other imaging techniques can also be used to map sample shape and detect areas of localized tilt in a similar manner. Merely as an example of an embodiment, multiple image based reflectometry measurements are used to detect a change in reflectance intensity. One image may be obtained without blocking any light at an aperture plane of a detector, and another image may be obtained while blocking some of the light at the aperture plane. The light that is blocked may be that portion that is reflected from parts of the sample that are not flat. These parts of the sample are warped or have localized tilt. The light from these parts of the sample is shifted at the aperture plane allowing part of it to be blocked, so that corresponding points in the image have a reduced intensity. Thus, comparing reflectance intensity between the images provides a means for detecting warp or localized tilt on the sample. Other embodiments and techniques are described herein.

In accordance with a particular embodiment, for example, a method for detecting areas of localized tilt on a sample using an imaging reflectometer include illuminating a measurement area on the sample using an input beam, and performing a first imaging reflectometry measurement. Performing the first imaging reflectometry measurement includes receiving, at an imaging sensor, a first imaging beam reflected from the sample. An iris positioned at an aperture plane of the imaging reflectometer is configured so that the first imaging beam passes through a pupil of the iris and the iris does not block any portion of a first beam reflected from the sample. A first image of the measurement area is obtained using the first imaging beam reflected from the sample and received at the imaging sensor. The method also includes performing a second imaging reflectometry measurement by receiving, at the imaging sensor, a second imaging beam reflected from the sample. The iris positioned at the aperture plane of the imaging reflectometer is configured so that the second imaging beam passes through the pupil of the iris and the iris blocks a portion of a second beam reflected from the sample. A second image of the measurement area is obtained using the second imaging beam reflected from the sample and received at the imaging sensor. The method also includes detecting the areas of localized tilt within the measurement area by comparing first reflectance intensity values of pixels in the first image with second reflectance intensity values of corresponding pixels in the second image.

In accordance with another embodiment, a method for detecting areas of localized tilt on a sample using an imaging reflectometer configured for dark field measurements includes illuminating a measurement area on the sample using an input beam, a portion of the input beam passing through an illumination pupil; receiving, at an imaging sensor, portions of an imaging beam reflected from the areas of localized tilt on the sample, the portions of the imaging beam reflected from the areas of localized tilt passing through an imaging pupil, wherein the imaging pupil is configured to block portions of an imaging beam reflected from flat areas on the sample; obtaining a first image of the measurement area using the portions of the imaging beam reflected from the areas of localized tilt on the sample and received at the imaging sensor; and detecting the areas of localized tilt within the measurement area based on locations of bright spots within the first image.

In accordance with another embodiment, a method for detecting areas of localized tilt on a sample using an imaging reflectometer includes illuminating a measurement area on the sample using an input beam, and performing a first imaging reflectometry measurement. Performing the first imaging reflectometry measurement includes receiving, at an imaging sensor, a first imaging beam reflected from the sample. A pupil of an iris positioned at an aperture plane of the imaging reflectometer is offset laterally relative to a first beam reflected from the sample so that a portion of the first imaging beam passes through the pupil of the iris and a portion of the first imaging beam is blocked at the iris. A first image of the measurement area is obtained using the portion of the first imaging beam that passes through the pupil of the iris and is received at the imaging sensor. The method also includes performing a second imaging reflectometry measurement by receiving, at the imaging sensor, a second imaging beam reflected from the sample. The pupil of the iris positioned at the aperture plane of the imaging reflectometer is offset laterally relative to a second beam reflected from the sample so that a portion of the second imaging beam passes through the pupil of the iris and a portion of the second imaging beam is blocked at the iris. A second image of the measurement area is obtained using the portion of the second imaging beam that passes through the pupil of the iris and is received at the imaging sensor. The method also includes detecting the areas of localized tilt within the measurement area by comparing first reflectance intensity values of pixels in the first image with second reflectance intensity values of corresponding pixels in the second image.

In accordance with yet another embodiment, a method for detecting areas of localized tilt on a sample using an imaging reflectometer includes illuminating a measurement area on the sample using an input beam; receiving, at an imaging sensor, an imaging beam reflected from the sample, the imaging beam reflected from the sample passing through an imaging pupil; and obtaining a first image of the measurement area using the imaging beam reflected from the sample and received at the imaging sensor. The method also includes illuminating a measurement area on the sample using an input beam, a portion of the input beam being blocked at an illumination pupil; receiving, at an imaging sensor, an imaging beam reflected from the sample, the imaging beam reflected from the sample passing through an imaging pupil; and obtaining a second image of the measurement area using the imaging beam reflected from the sample and received at the imaging sensor. The method also includes detecting the areas of localized tilt within the measurement area and determining slope of the areas of localized tilt based on a change in amount of brightness of pixels within the second image compared with brightness of corresponding pixels in the first image.

In an embodiment, about half of the input beam is blocked at the illumination pupil.

In another embodiment, the areas of localized tilt within the measurement area of said second image having positive and negative slope present as regions of greater or lower brightness, or vice-versa, as compared with said first image.

Further aspects, advantages, and features are apparent from the claims, description, and accompanying drawings.

BRIEF DESCRIPTION OF THE DRAWINGS

The various embodiments described herein, both as to organization and method of operation, together with features and advantages thereof, can best be understood by reference to the following detailed description and accompanying drawings, in which:

FIGS. 7A-7B are simplified diagrams illustrating how knife edge arrangements can be used to determine local tilt in a given direction in accordance with an embodiment.

Figure 1:
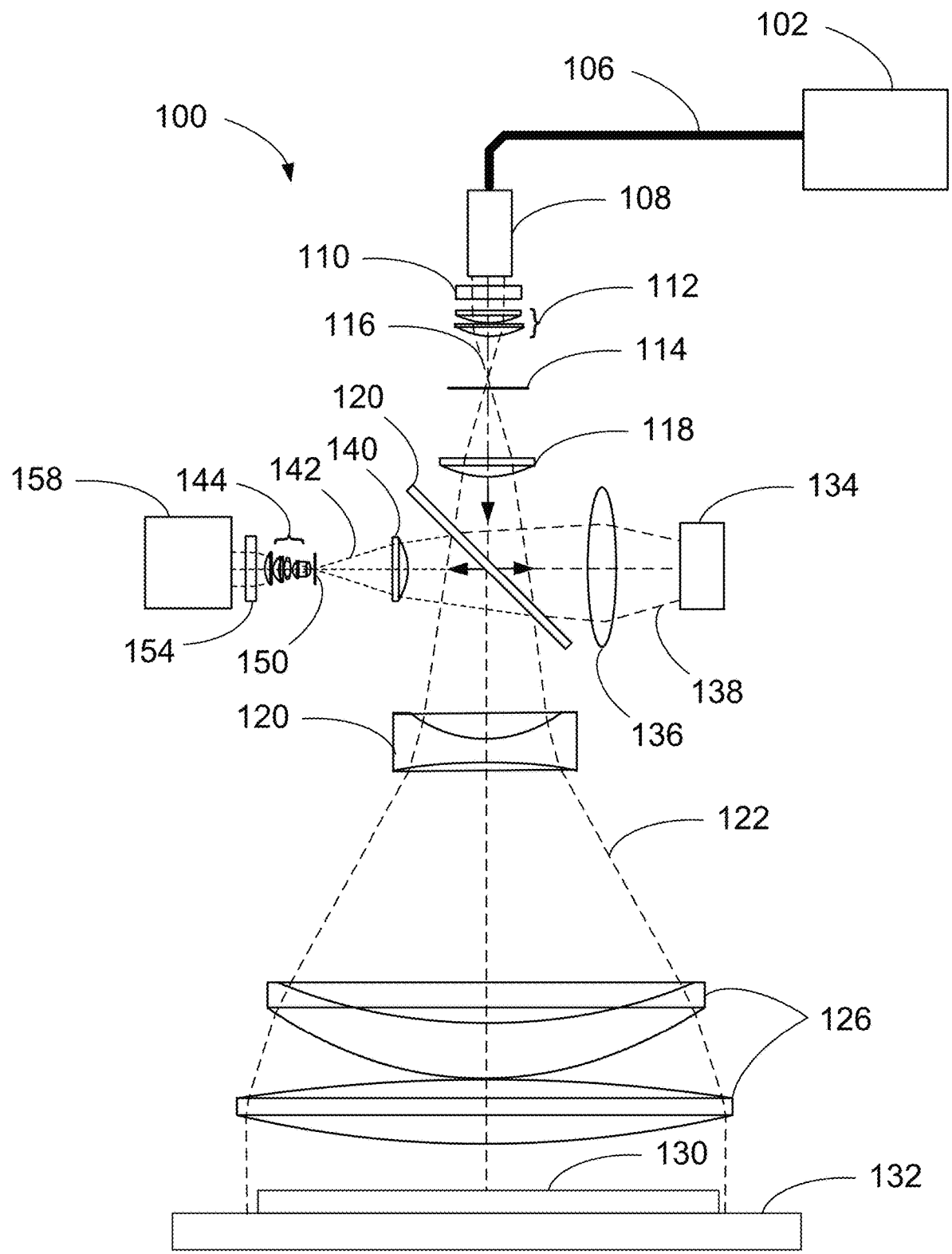
FIG. 1 is a simplified cross-sectional view of an imaging reflectometer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the embodiments described herein. However, it should be understood that the various embodiments can be practiced without these specific details. In other instances, well-known methods, procedures, and components have not been described in detail so as not to obscure the described features.

Reference will be made in detail to the various embodiments, one or more examples of which are illustrated in the figures. Each example is provided by way of explanation and is not meant as a limitation. Further, features illustrated or described as part of one embodiment can be used on or in conjunction with other embodiments to yield yet further embodiments. The description is intended to include these modifications and variations.

A "specimen," "sample," or "wafer" as referred to herein includes, but is not limited to, a semiconductor wafer, a semiconductor work piece, a photolithography mask, and other work pieces such as memory disks and the like. According to some embodiments, which can be combined with other embodiments described herein, the systems and methods are configured for or are applied to surface metrology applications such as reflectometry.

Embodiments described herein relate generally to improving methods for mapping wafer shape and/or detecting areas of localized tilt on a wafer. In some embodiments, one image is obtained without blocking any light at an aperture plane of a detector, and another image is obtained while blocking some of the light at the aperture plane. Changes in reflectance intensity between the images can be used to identify warp and/or localized tilt on the wafer.

FIG. 1 is a simplified cross-sectional view of an imaging reflectometer 100 in accordance with an embodiment. The imaging reflectometer 100 shown in this example can be used to implement the methods described herein. However, the imaging reflectometer 100 is shown merely as an example, and other imaging reflectometers and/or other imaging techniques can perform the described methods. Merely by way of example, imaging reflectometers configured to obtain images of a part of a sample, rather than an entire sample, and/or imaging reflectometers using single or multi-wavelength light sources, may be used to perform the methods.

In the example of FIG. 1, light from a source module 102 is relayed through a light guide 106 to a homogenizer 108. Light 116 from the homogenizer 108 passes through illumination pupil 114 and is directed toward beam splitter 120. A portion 138 of the light 116 is reflected by the beam splitter 120 toward a reference sensor 134, and a portion 122 of the light passes through the beam splitter 120 and continues along an optical path toward a sample 130.

The portion 122 of the light 116 that passes through the beam splitter 120 is imaged by a lens 126 onto the sample 130. Light reflected from the sample 130 is directed through at least a portion of the lens 126 and reflected by the beam splitter 120 toward an imaging sensor 158.

The imaging reflectometer 100 may include a number of other lenses (e.g., 110, 112, 118, 136) that shape and/or direct the light along the optical paths to illuminate the sample 130, illuminate the reference sensor 134, direct the light to other lenses (e.g., 120, 140, 144), and direct the light reflected from the sample to the imaging sensor 158. In some embodiments, for example, the light may pass through one or more polarizers (e.g., polarizers 110, 154). The one or more polarizers can be inserted in an illumination and/or an imaging path to provide enhanced sensitivity for different characteristics of the sample 130. Wave plates can also be inserted to alter the phase of the polarized light. The wave plates and/or polarizers can be at fixed angles to provide polarized reflectometry measurements or can be rotating to provide ellipsometry measurements. It should be appreciated that imaging reflectometers in accordance with the embodiments described herein may not include all the optical elements shown in the example of FIG. 1 and/or may include other optical elements that are not included in this example.

The source module 102 in this example provides a multi-wavelength light source that may sequentially generate different light beams each having a narrow wavelength range. In some embodiments, the multi-wavelength light source is provided by a plurality of light sources that can be activated individually. Each of the light sources generates a light beam, and at least some of the light beams have different nominal wavelengths.

In other embodiments, the multi-wavelength light source is provided by adjusting the source power to the source module 102 to generate light beams having different nominal wavelengths. The power of each wavelength can be independently controlled to optimize the dynamic range of measured reflectance at each wavelength.

In yet other embodiments, the multi-wavelength light source is provided by a broadband light source and a set of band pass filters. The broadband light source may be used with the band pass filters to generate the light beams at selected nominal wavelengths.

In yet other embodiments, the source module 102 may include both a plurality of light sources, a broadband light source, and a set of band pass filters.

In an embodiment, the lens 126 has a measurement field size (or illumination area) that is slightly greater than a size of the sample 130 so that full-sample images can be acquired by the imaging sensor 158 without scanning the light or moving a stage 132. For example, the lens 126 may have a measurement field size of 300 mm or more for measuring a semiconductor wafer having a 300 mm diameter. The lens 126 may be a telecentric lens so that light rays traveling from the lens 126 to the sample 130 are approximately parallel to an optical axis that is substantially perpendicular to a surface of the sample 130. This provides substantially normal illumination over the entire sample 130 or across an entire measurement area. This can reduce measurement error since the illumination angles are approximately the same. Telecentric imaging allows the light reflected at substantially the same angle across the entire field to reach an imaging sensor. In an embodiment, for example, the light illuminating the sample 130 may have a telecentricity error of less than 0.3 degrees over a wavelength range of about 350 nm to about 1200 nm, and in some embodiments, a telecentricity error of less than 1% over a wavelength range of about 350 nm to about 1100 nm. As used herein, the telecentricity error is a measure of angular deviation of a light ray incident and reflected from the wafer surface from normal (or from the optical axis).

In some embodiments, the lens 126 may be a lens that has a field size that is smaller than the sample 130. In this case, an area (or measurement area) is imaged and the optics and/or the stage 132 may be moved and/or the optical module may be scanned to image adjacent fields. Depending on the application, a measurement area may be approximately the same size as a die or stepper field. Adjacent images may be stitched together using known techniques to provide multi-field or full-sample images.

The imaging sensor 158 may be an area imaging sensor that includes one or more digital cameras for capturing the light 142 that is reflected from the sample 130 and passes through a pupil at an aperture plane 150. The imaging sensor 158 provides an image of the sample 130 based on the received light 142. The imaging sensor 158 may include a single camera in some embodiments that is configured to image the entire surface of the sample 130. In other embodiments, the imaging sensor 158 may include a single camera that is configured to image a part of the sample 130. In yet other embodiments, the imaging sensor 158 may include multiple cameras that each image adjacent or slightly overlapping fields (or measurement areas) on the sample 130. Adjacent images may be stitched together using known techniques. Image resolution may be increased by using a higher resolution imaging sensor or using multiple imaging sensors that each image a smaller field.

The imaging reflectometer 100 includes an illumination path that provides light to the sample 130 and an imaging path that provides reflected light to the imaging sensor 158. This allows independent control of an illumination numerical aperture (NA) and an imaging NA. Merely by way of example, if the imaging sensor 158 has an array size of 5120 pixels by 5120 pixels, and the imaging NA is about 0.004, the pixel size on the sample 130 is about 60 μm for a 300 mm wafer, which has a Rayleigh resolution of about 55 μm at a wavelength of 365 nm and a Rayleigh resolution of about 153 μm at a wavelength of 1 μm. Generally, the illumination NA is greater than the imaging NA to correct residual chromatic telecentric errors and to provide tolerance to tilt and bow of the sample 130. In some embodiments, the illumination NA may range from about 0.005 to about 0.5, and the imaging NA may range from about 0.003 to about 0.2.

The reference sensor 134 may include one or more digital cameras for capturing the light 138 that is reflected from the beam splitter 120. The reference sensor 134 may have a lower resolution than the imaging sensor 158. The reference sensor 134 may be used to monitor uniformity and stability of the light 138 and to provide real time calibration of the reflectance measurements made by the imaging sensor 158. Measurements at the reference sensor 134 may be used to adjust characteristics of the light sources (e.g., output power) to provide spatial and temporal corrections.

Figure 2:
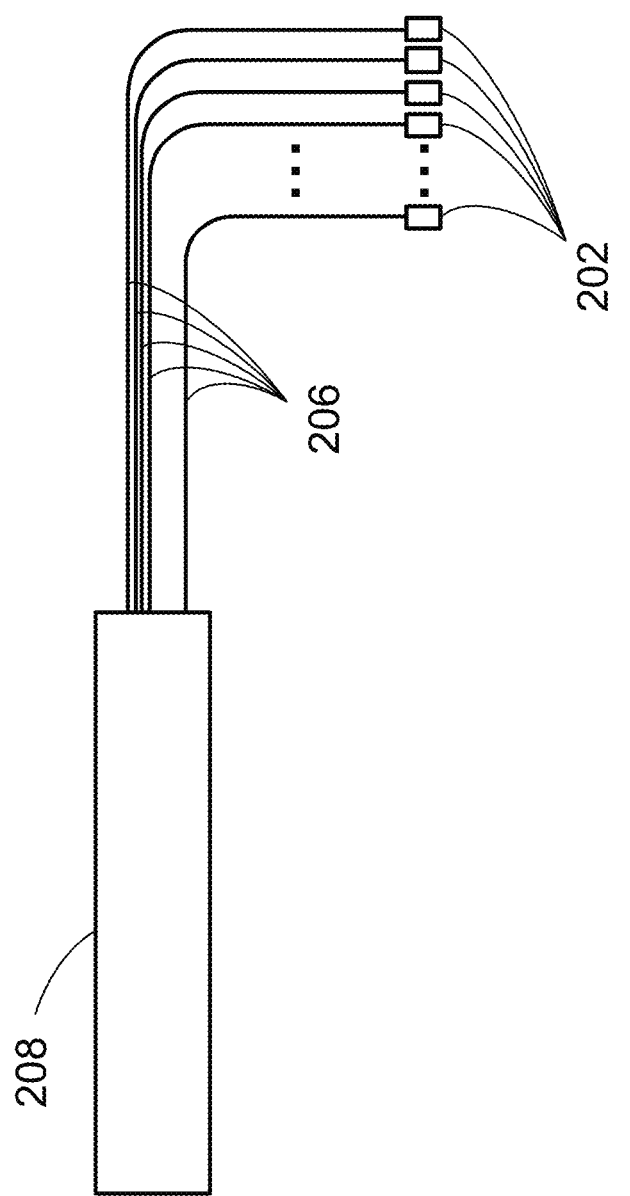
FIG. 2 is a simplified cross-sectional view of a multi-wavelength light source.

FIG. 2 is a simplified cross-sectional view of a multi-wavelength light source in accordance with an embodiment. The multi-wavelength light source may be used, for example, as part of the source module 102 of the imaging reflectometer 100 of FIG. 1. The multi-wavelength light source includes a plurality of light sources 202 and a plurality of optical fibers 206. The light sources 202 may each include one or more light emitting diodes (LEDs) and/or laser diodes (LDs). The light sources 202 are each optically coupled with a homogenizer 208 by one of the optical fibers 206. Each of the light sources 202 generates a beam, and at least some of the beams may have different nominal wavelengths. Light from the homogenizer 208 may be directed to a lens and used to image a sample as described with regard to FIG. 1.

In an embodiment, the multi-wavelength light source sequentially generates different ones of the input beams and/or sequentially generates combinations of multiple input beams. The beams may be sequentially generated at a switching rate that is generally the same as the frame rate of an imaging sensor (e.g., the imaging sensor 158 shown in FIG. 1) to achieve one image per wavelength of the same field on a sample. The frame rate of a sensor can be faster than the wavelength switching rate in some embodiments. A faster switching rate enables averaging of multiple images at each wavelength to achieve higher signal to noise ratio. Output power for each of the light sources 202 and/or integration time may be independently controlled and adjusted so that the sensor signal is close to saturation at each wavelength to maximize signal to noise ratio. Each of the light sources 202 may have sufficient output power to enable high speed measurements (or measurements at or near a readout speed of the imaging sensor).

In some embodiments, the optical throughput may be increased by inserting diffusers between the optical fibers 206 and the homogenizer 208. Multiple light sources 202 can be combined by other means such as dichroic beam splitters, and the light sources 202 can be coupled with the homogenizer 208 by other means such as free space optics relay.

In some embodiments, band pass filters can be inserted between each of the light sources 202 and their respective optical fiber 206 to narrow the bandwidth of each wavelength. Narrower bandwidths can provide better sensitivity for measurement of thick film stacks or dense patterns on a surface of the sample. Bandpass filters can define measurement wavelengths accurately by eliminating the wavelength drift of LEDs to improve measurement accuracy.

The imaging sensor (e.g., the imaging sensor 158 shown in FIG. 1) may have a high readout speed (e.g., 50 to 1000 frames per second (FPS) or more and up to 100 million pixels per frame or more). As an example, at a readout speed of 100 FPS, the imaging sensor may be capable of performing 6000 reflectivity measurements per minute. The measurements can be at the same or different wavelengths. Obtaining multiple measurements at the same wavelength can enhance signal to noise ratio and improve measurement sensitivity.

Figure 3:
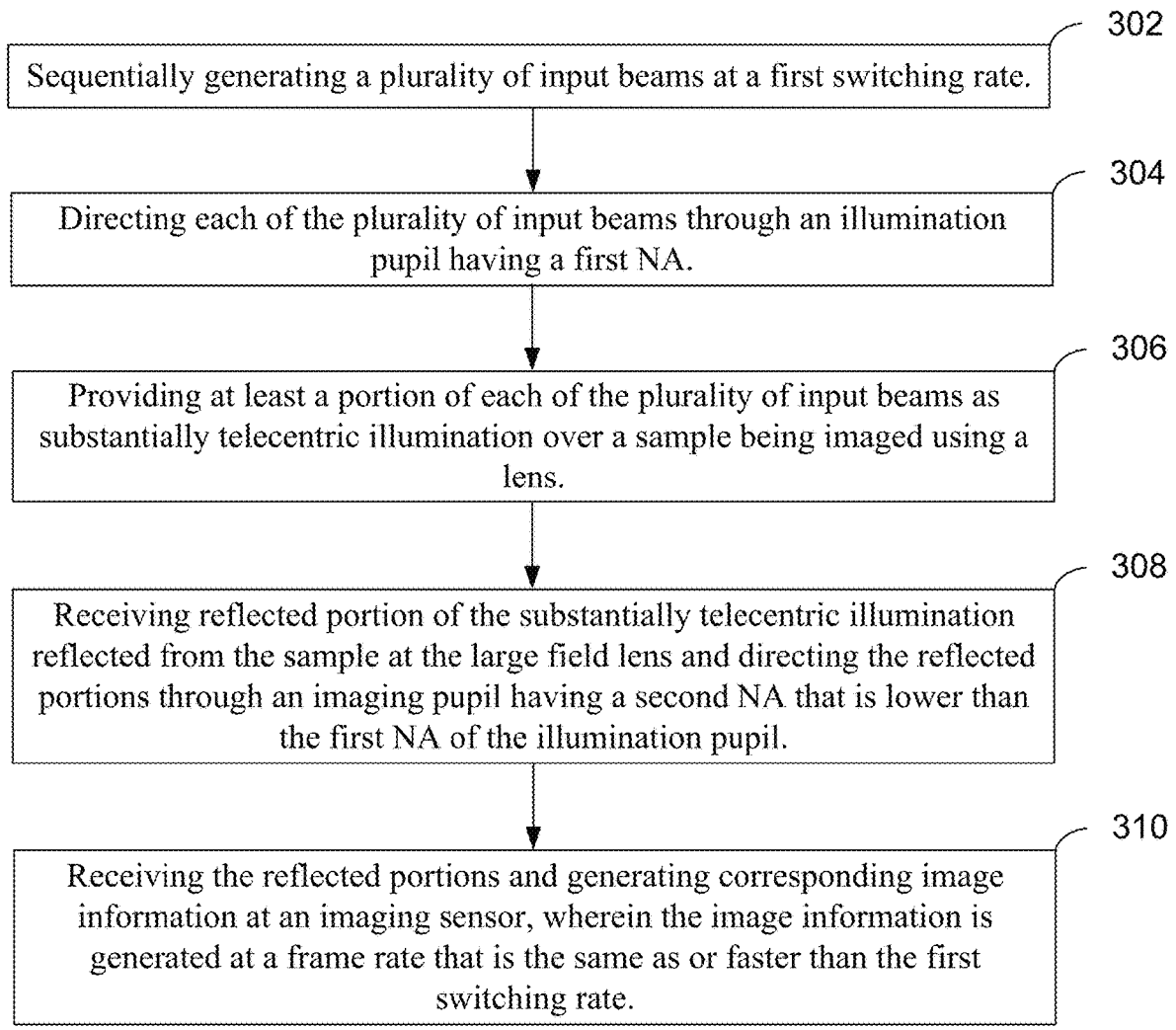
FIG. 3 is a flowchart outlining a method for measuring reflectivity of a sample.

FIG. 3 is a flowchart outlining a method for measuring reflectivity of a sample using an imaging reflectometer. The method includes sequentially generating a plurality of input beams at a first switching rate (302). In some embodiments, each of the plurality of input beams are generated by a different light source, and at least some of the plurality of input beams may have different nominal wavelengths and/or integration times than others of the plurality of input beams. In other embodiments, at least some of the plurality of input beams are generated by a broadband light source, and a wavelength of each of the plurality of input beams is defined using a set of band pass filters.

Each of the plurality of input beams is directed through an illumination pupil having a first NA (304). The illumination pupil may be arranged along a first optical path. In some embodiments, each of the plurality of input beams may be split, and a first portion of each of the plurality of input beams may be directed along a first optical path toward a reference sensor, and a second portion of each of the plurality of input beams may continue along the first optical path.

At least a portion of each of the plurality of input beams is provided as substantially telecentric illumination over a sample being imaged using a lens (306). A portion of each of the plurality of input beams may also be provided to the reference sensor for monitoring uniformity and stability of the input beams. In some embodiments, a measurement field of the lens may larger than the sample being imaged to provide full-sample measurements.

Reflected portions of the substantially telecentric illumination reflected from the sample are received at the lens and directed through an imaging pupil having a second NA that is lower than the first NA of the illumination pupil (308). The reflected portions may be directed through the imaging pupil using a beam splitter.

The reflected portions are received and corresponding image information is generated at an imaging sensor module, wherein the image information is generated at a frame rate that is the same as or faster than the first switching rate (310). The image information may be calibrated or normalized based on information from the reference sensor.

In some embodiments, images may be processed to identify process excursions. The images may be processed in accordance with known excursion identification techniques. For example, the reflectances measured at multiple wavelengths can be compared to modeled reflectance or known good samples. Measured patterns may also be compared at different locations across the sample to identify variation and/or outliers. Measured variation can be quantified by calculating root-mean-squared (RMS) difference at multiple wavelengths. Measurement sensitivity can be enhanced by selecting the wavelength or wavelengths that have the highest sensitivity based on measurement data. Multiple wavelength reflectance can be processed by non-linear regression to a theoretical model to derive film thickness and/or CD of a pattern.

It should be appreciated that the imaging reflectometers described herein may be configured as standalone metrology tools or integrated with other metrology or process tools. As an example, an imaging reflectometer as described herein may be integrated with a process tool and arranged outside a window separating the imaging reflectometer from a process chamber. In some embodiments, a lens arranged outside the window provides illumination for a sample arranged inside the process chamber. The lens may be configured to provide illumination to all or a portion of the sample (e.g., a measurement area may be about the same size as a die or stepper field, or may be another size such as a few centimeters on the side). This allows reflectometry measurements to be performed during and/or immediately after processing while samples are inside a vacuum chamber. This can shorten the control loop, improve process control, and avoid material damage caused by air in the environment.

Imaging reflectometers may use a spectral imaging configuration, in which fields of varied sizes are sequentially imaged at different illumination wavelengths. An integration time per field may be variable depending on the sample reflectivity at that wavelength. Images obtained at each wavelength may be stored at the imaging reflectometer or in remote storage.

Figure 4A:
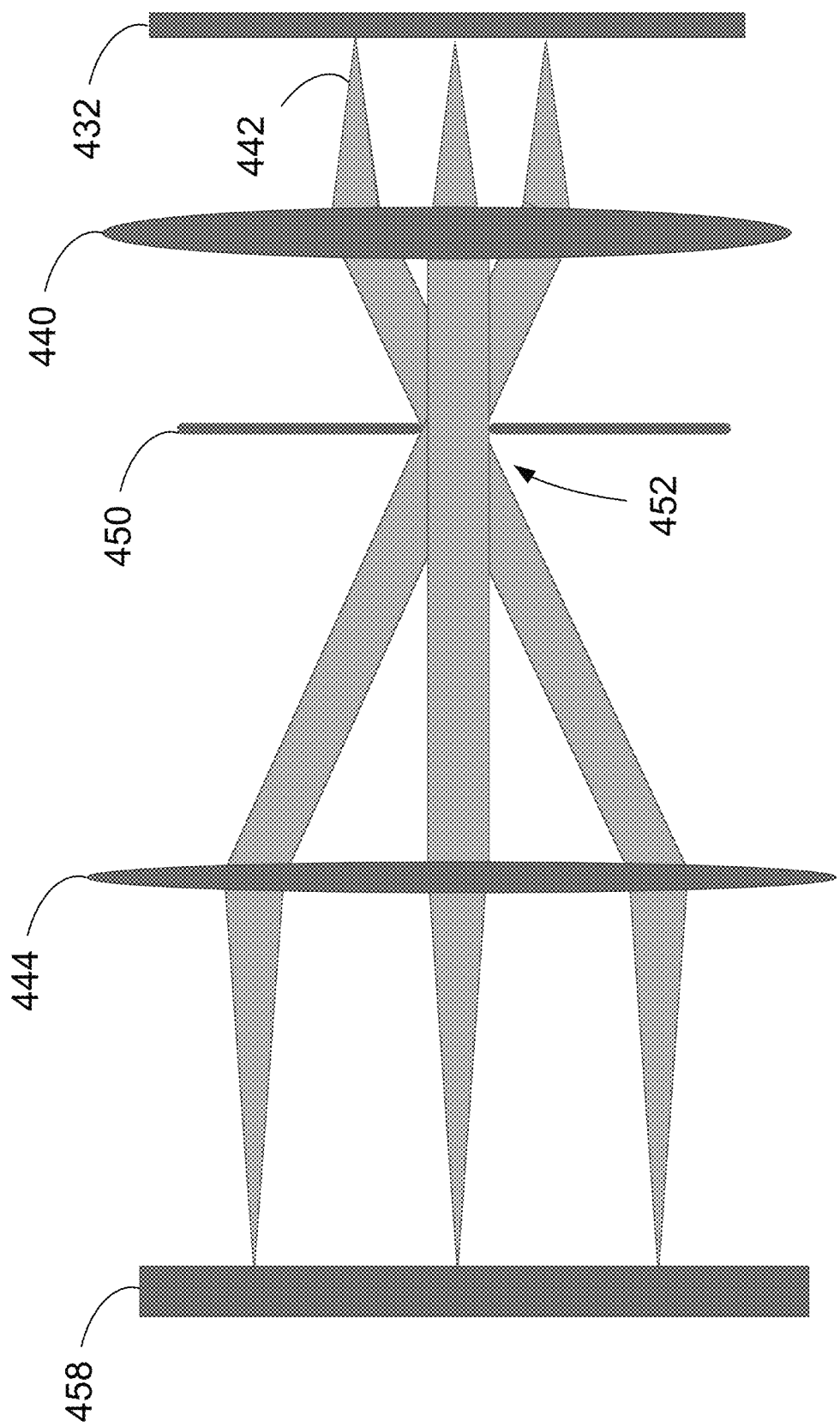
FIGS. 4A-4C are simplified cross-sectional views of light passing through an aperture at an aperture plane of an imaging reflectometer in accordance with some embodiments.

The imaging path includes a pupil or aperture at an aperture plane. The aperture plane is located along the imaging path at a region where substantially all the light reflected from the sample passes. This is shown in FIG. 4A, where reflected light 442 from points on a sample 432 within a measurement area is focused by a lens 440 and passes through an aperture 452 of an aperture plane 450. After passing through the aperture 452, the light 442 is directed by a lens 444 to an imaging sensor 458.

Substantially all the reflected light 442 passes through the aperture 452 during normal operation of an imaging reflectometer. Normal operation is where a surface of the sample 432 is substantially orthogonal to an optical axis. However, when the sample includes a region of local tilt, a position of the light returning from the titled point is shifted. This is better understood with reference to FIG. 4B. As shown in this example, the sample 432 includes a tilted region 456 that causes a shift in reflected light 442a from that region. The reflected light 442 from other regions on the sample 432 is not shifted. As this example illustrates, the reflected light 442a from the tilted region 456 is shifted at a position where an aperture plane would be located. The aperture plane shown in FIG. 4A is not shown in FIG. 4B to more clearly illustrate the shift of the reflected light 442a from the tilted region 456.

Figure 4B:
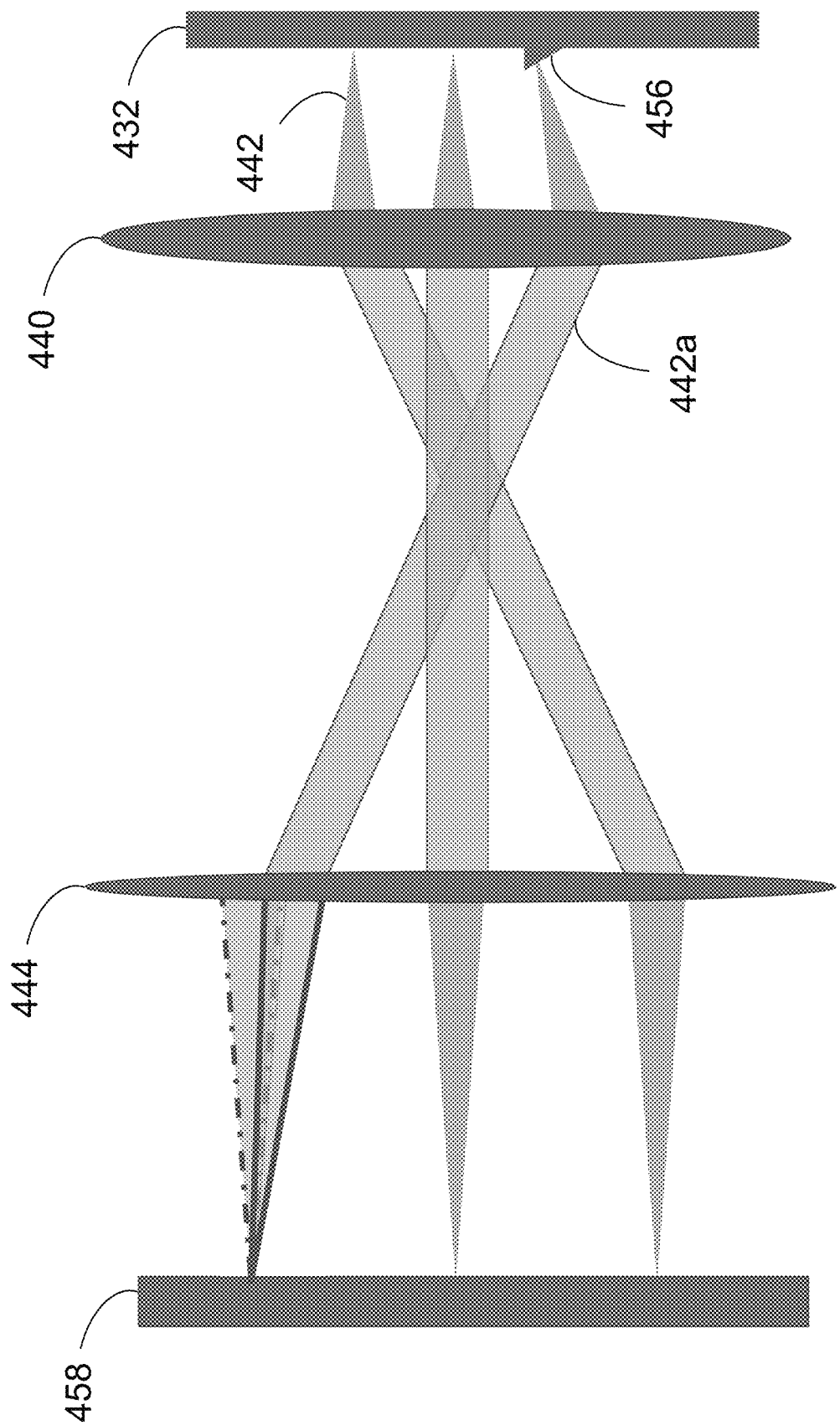

Under normal conditions, an imaging system is designed to be tolerant of this type of shift. As can be seen in FIG. 4A, provided that an optical field at the aperture plane 450 is not obstructed, the reflected light 442 from the sample 432 passes through the aperture 452 unimpeded to an intended image point on the imaging sensor 458. In the scenario of FIG. 4B, the only effect of the tilted region 456 is that the reflected light 442a arrives at the corresponding image point at an angle, which is usually imperceptible since an angle of the tilted region 456 is generally quite small.

Figure 4C:
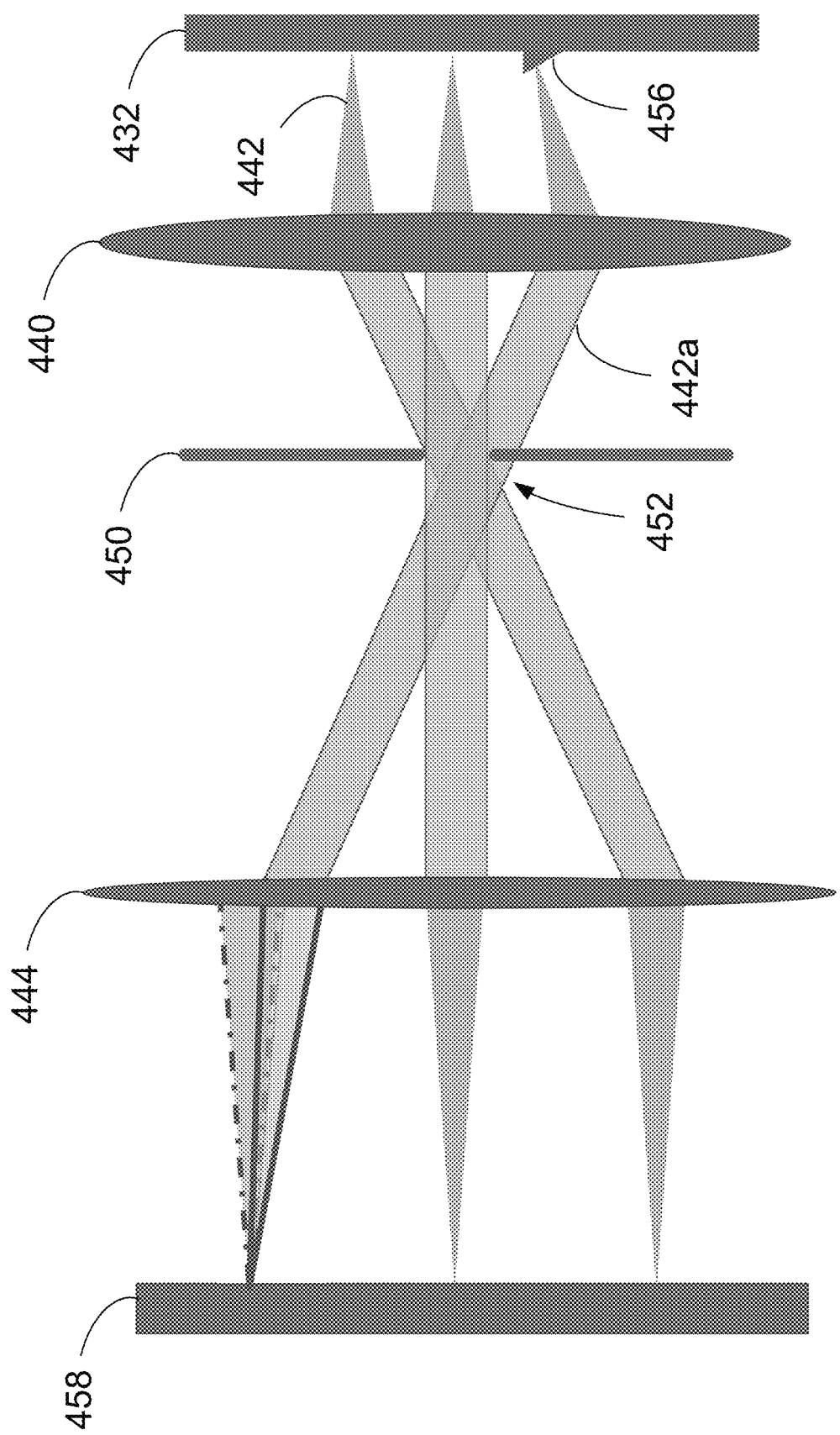

In some embodiments, the aperture 452 is a variable aperture or iris. Some imaging reflectometry measurements may be performed with the aperture 452 open so that none of the reflected light 442 is blocked at the aperture plane 450. Other imaging reflectometry measurements may be performed with the aperture 452 at a reduced size so as to just contain a physical size of the reflected light under normal conditions. In this configuration, any shift in the reflected light 442 will have a commensurate change in an amount of energy that passes through the aperture 452 toward the imaging sensor 458. This can be explained with reference to FIG. 4C, where a part of the reflected light 442a that is shifted is blocked at the aperture plane 450 (or aperture plate). In this simplified example, the reflected light 442a that is shifted is shown as passing through the aperture plane 450, but in actual operation, the aperture plane 450 blocks a part of the reflected light 442a so that less light reaches the imaging sensor 458. This will cause a change in a signal level detected from the tilted region 456 on the sample 432.

A magnitude of the signal change can be estimated. If the sample 432 is at a nominal focal plane of an objective lens, a tilt θ of the sample results in a lateral shift of Fθ, where F is a focal length of the objective lens.

A position of the reflected light 442a from the titled region 456 is shifted at the aperture plane 450 regardless of a position of the titled region 456 on the sample 432. Reflected light from all tilted regions within a field of view are shifted. The same size of aperture 452 at the aperture plane 450 that generates an intensity change due to a tilted region at one point on the sample 432 generates an intensity change for all titled regions within a measurement area (or field of view). That is, an image can provide information about local topography across a measurement area in addition to providing reflectance intensity values.

For any given point on the sample 432, and for any given wavelength of light, an image of a measurement area on the sample 432 can be represented as $K(\lambda)*M(\lambda)*I(\lambda)*R(\lambda)$, where I is the illumination intensity and R is the reflectance, both at a given wavelength ($\lambda$). Here, M represents a percentage of the light that passes through the aperture 452, and K is a proportionality constant. This representation is reasonable for a properly designed telecentric lens, since the reflected light from every point on the sample will fill the aperture 452 substantially uniformly, and thus a shift in the position of the light distribution at the aperture plane 450 is manifested as a multiplier of an amount of energy.

In accordance with some embodiments, both reflectance and tilt information can be obtained from imaging reflectometry measurements. Reflectance information is obtained by performing a measurement with an aperture or pupil of an iris wide open so that the iris does not block light reflected from the sample. Tilt information is obtained by (i) performing a measurement with the aperture or pupil of the iris wide open, and (ii) reducing a size of the aperture or pupil and performing a measurement. The size of the aperture or pupil is reduced so that light that is shifted by tilted regions is blocked at the iris (or aperture plane). All measurements may be performed at a single wavelength or at multiple wavelengths to obtain wavelength sensitivity information.

An image obtained in step (i) provides reflectance intensity values. By normalizing the image obtained in step (ii) on a point by point basis with respect to the image obtained in step (i), the parameter M, which corresponds to tilt, can be extracted on a point by point basis.

Dependence of the detected signal on tilt is not a direct measure of the local topography, but rather a derivative of the topography (i.e. local slope) of the sample 432 along a particular direction. For example, a local tilt on the sample 432 along an x-direction results in a shift of the reflected light 442a at the aperture plane 452 in the x-direction. Similarly, a local tilt on the sample 432 along a y-direction results in a shift of the reflected light 442a at the aperture plane 452 in the y-direction. Tilt along other directions similarly shifts the reflected light 442a at the aperture plane 452 in the respective direction.

Figure 5:
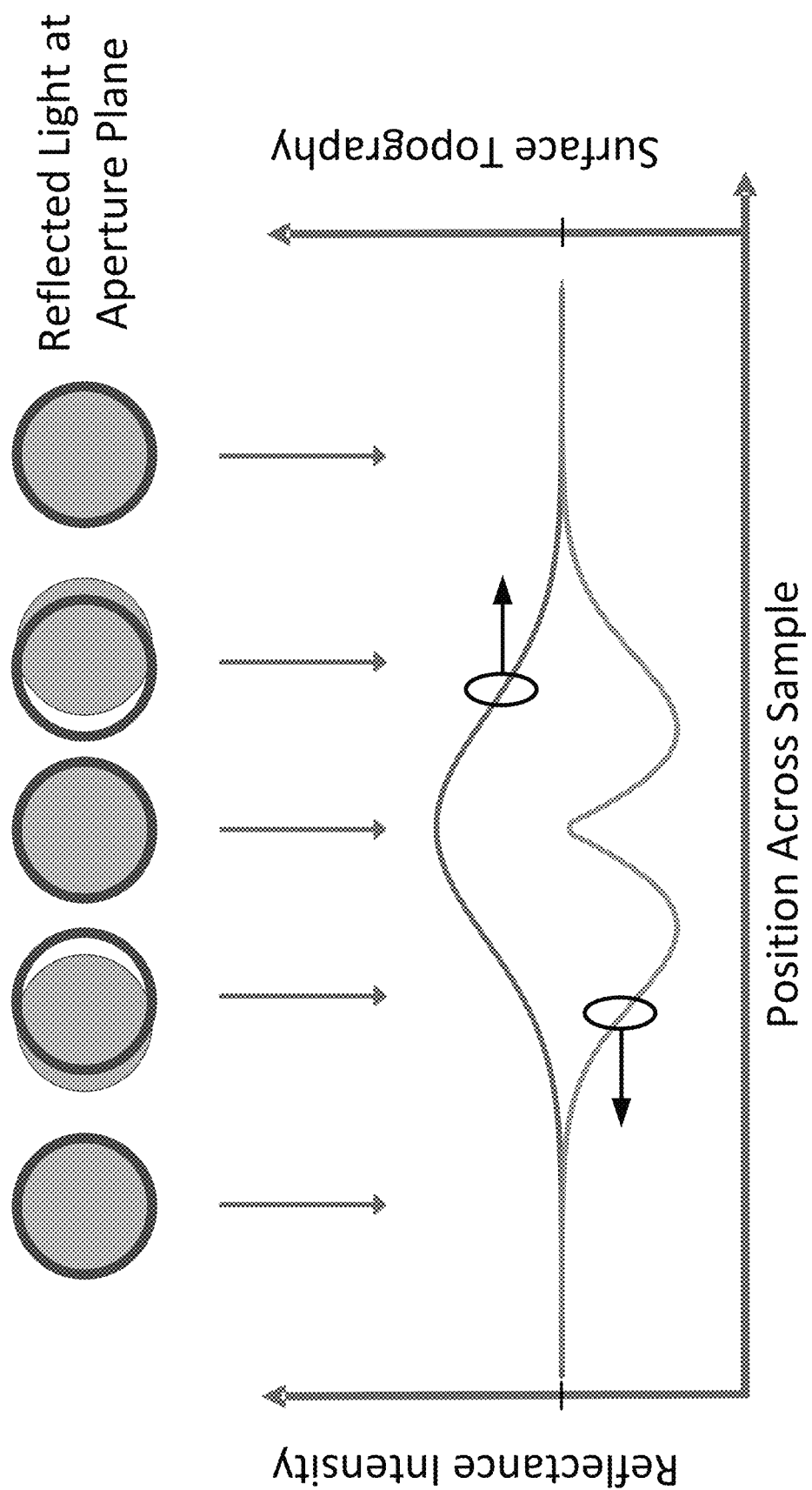
FIG. 5 is a simplified diagram illustrating measured reflectance intensity at different points around an area of local tilt on a sample in accordance with an embodiment.

FIG. 5 is a simplified diagram illustrating measured reflectance intensity at different points around an area of local tilt on a sample in accordance with an embodiment. The description of the effect of tilt on the image has thus far assumed an arrangement of a circular light distribution interrupted by a circular iris at an aperture plane. For the case of nominal orthogonality of the sample to illuminating light, and symmetric positioning of the light distribution with respect to a pupil of the iris, a given tilt will cause the light passing through the pupil of the iris to have a reduced intensity compared to the light from neighboring flat areas on the sample. This reduction in the reflectance signal applies whether the tilt has a positive slope or a negative slope. An image from a symmetric protrusion or depression on the sample is thus a dipole with negative-going peaks as shown. That is, an arrangement with symmetric positioning of the light distribution with respect to the pupil of the iris allows for detection of a feature but not for determination of whether the feature is a protrusion or a depression.

This is shown in FIG. 5, where reflected light from flat areas on a sample, including from a peak of the protrusion, substantially fill a pupil of an iris at an aperture plane without being blocked at the aperture plane. Measured reflectance intensity at these points is some nominal value. Reflected light from tilted areas on the sample, specifically from the sloping areas on each side of the protrusion, is shifted at the aperture plane. The portions of the beam that are outside the pupil of the iris are blocked at the aperture plane thus reducing measured reflectance intensity at these points. The right axis of the plot represents surface topography, and the left axis represents reflectance intensity. The circles above the plot represent the aperture at the aperture plane for corresponding points on the sample, and the circular shaded portions represent light at the aperture plane. In reality, all the light passes through a single aperture at the aperture plane, but the aperture and the light from each point is shown separately in this figure to illustrate the shift in reflected light from the sloped regions. Similar reflectance intensity values would be obtained from a depression on the sample with inward sloping sidewalls of a similar magnitude.

Figure 6:
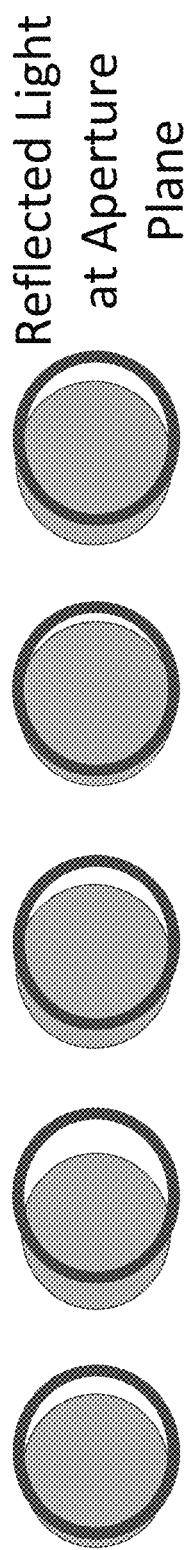
FIG. 6 is a simplified diagram illustrating measured reflectance intensity at different points around an area of local tilt on a sample in accordance with another embodiment.
Figure 6:
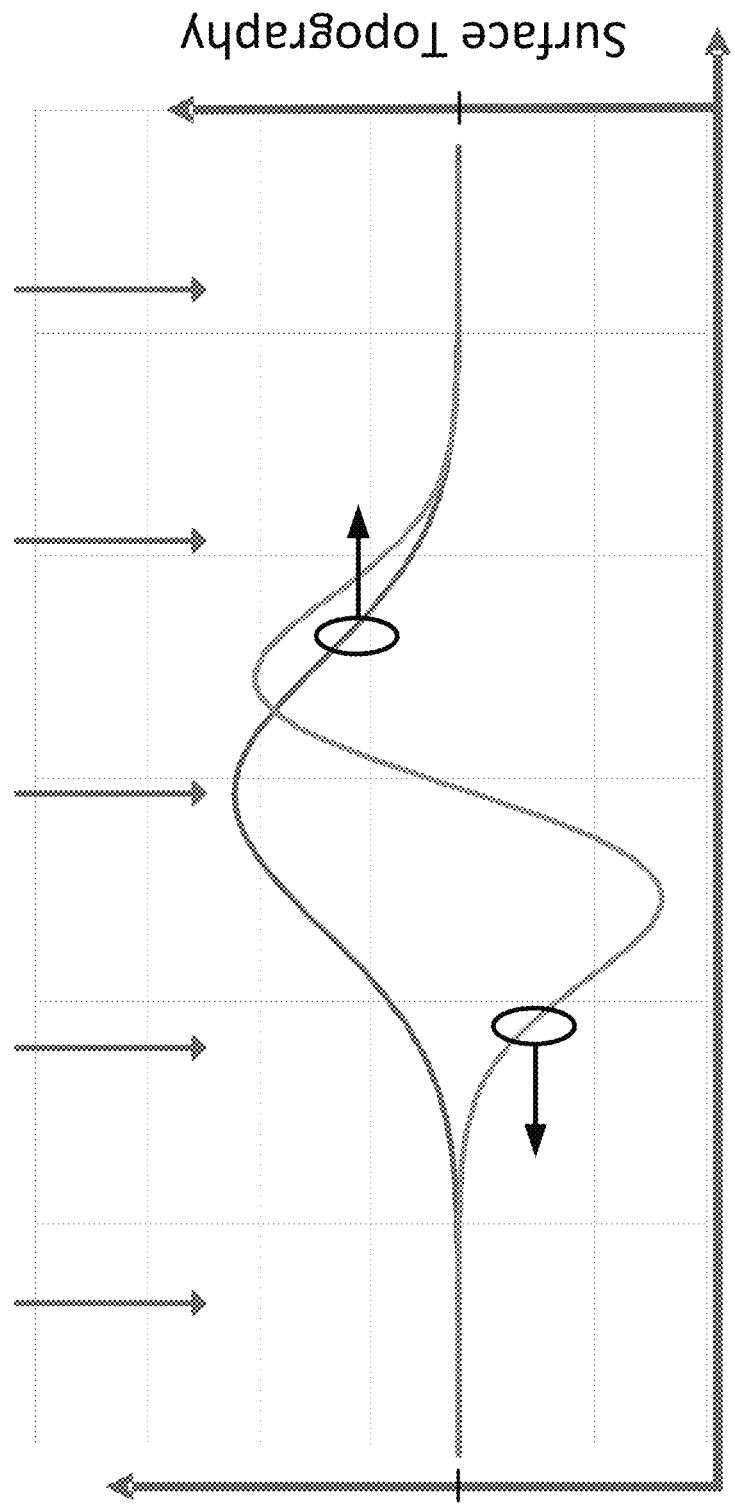

In some applications, it may be advantageous to determine characteristics of a feature. For example, it may be advantageous to determine if slope is positive or negative across an area of local tilt. This allows identification of a feature as a protrusion or a depression. In accordance with an embodiment, a position of a pupil of an iris is shifted (or displaced) with respect to the light distribution at an aperture plane along a direction of interest (e.g., displaced along an x-direction or a y-direction). This allows characteristics of a feature to be determined. This arrangement is shown in FIG. 6, where the pupil of the iris is shifted in the horizontal direction so that some light reflected from flat areas on a sample is blocked at the aperture plane (including light reflected from a peak of the protrusion). This is shown by the circles and circular shaded portions above the plot. Because some of the light is blocked, the measured reflectance intensity from these flat areas is less than a maximum. Furthermore, in the case of a patterned sample, this arrangement slightly reduces an extent of detected spatial frequencies emanating from the sample due to scattering. In some embodiments, the shift of the pupil of the iris may be small so that impact on image brightness is minimal.

As shown in FIG. 6, light reflected from the tilted regions (or sides of the protrusion) is shifted compared to the light reflected from the flat areas. For the tilted area having a positive slope (on the left side of the protrusion), the reflected light is shifted so that more light is blocked at the aperture plane than that of the flat areas. For the titled area having a negative slope (on the right side of the protrusion), the reflected light is shifted so that less light is blocked at the aperture plane than that of the flat areas. Thus, in this example, the reflectance intensity values increase and decrease differently for positive and negative slopes. Using this arrangement, an image of a feature is a dipole, whose polarity (i.e. negative to positive, or positive to negative) determines a nature of the feature (i.e. a protrusion or depression). In some embodiments, an amount the pupil of the iris is shifted is determined by an expected maximum tilt on the sample so that polarity is persevered for all expected features on the sample.

The example of FIG. 6 illustrates that for an arrangement where there is a linear offset between a center of the pupil of the iris and the light distribution along a particular direction (e.g., along the x-direction), the maximum sensitivity to tilt is also along that direction. The arrangement will be less sensitive to tilt in the orthogonal direction (e.g., along the y-direction), although there may be some change in intensity from tilt in the orthogonal direction.

In some applications, it may be advantageous to determine local tilt in a given direction (e.g., x-direction) while further minimizing the influence of local tilt along the orthogonal direction (e.g., y-direction). In accordance with some embodiments, this is provided using a knife edge arrangement as shown in FIGS. 7A-7B. In a first example shown in FIG. 7A, a one-dimensional barrier or knife edge is arranged to block some of the reflected light at an aperture plane. The two circles and double headed arrow represent a shift in the reflected light at the aperture plane from features that have a tilt along the x-axis. The knife edge blocks different amounts of reflected light depending on the shift in the reflected light. Thus, the arrangement of FIG. 7A is sensitive to features that have a tilt along the x-axis.

In FIG. 7B, the knife edge is arranged relative to the aperture plane in a same manner as that of FIG. 7A. The two circles and double headed arrow in FIG. 7B represent a shift in the reflected light at the aperture plan from features that have a tilt along the y-axis. In this case, the knife edge blocks the same amount of reflected light regardless of the shift in the reflected light. Thus, the arrangement of FIG. 7B is not sensitive to features that have tilt along the y-axis. A measured intensity will be the same regardless of the shift in the reflected light.

A knife edge can be arranged in a similar manner along any direction to detect features tilted along that direction. As an example, the knife edge can be arranged horizontally (rather than vertically as shown in FIGS. 7A-7B) to detect areas of local tilt along the y-direction.

Figure 8:
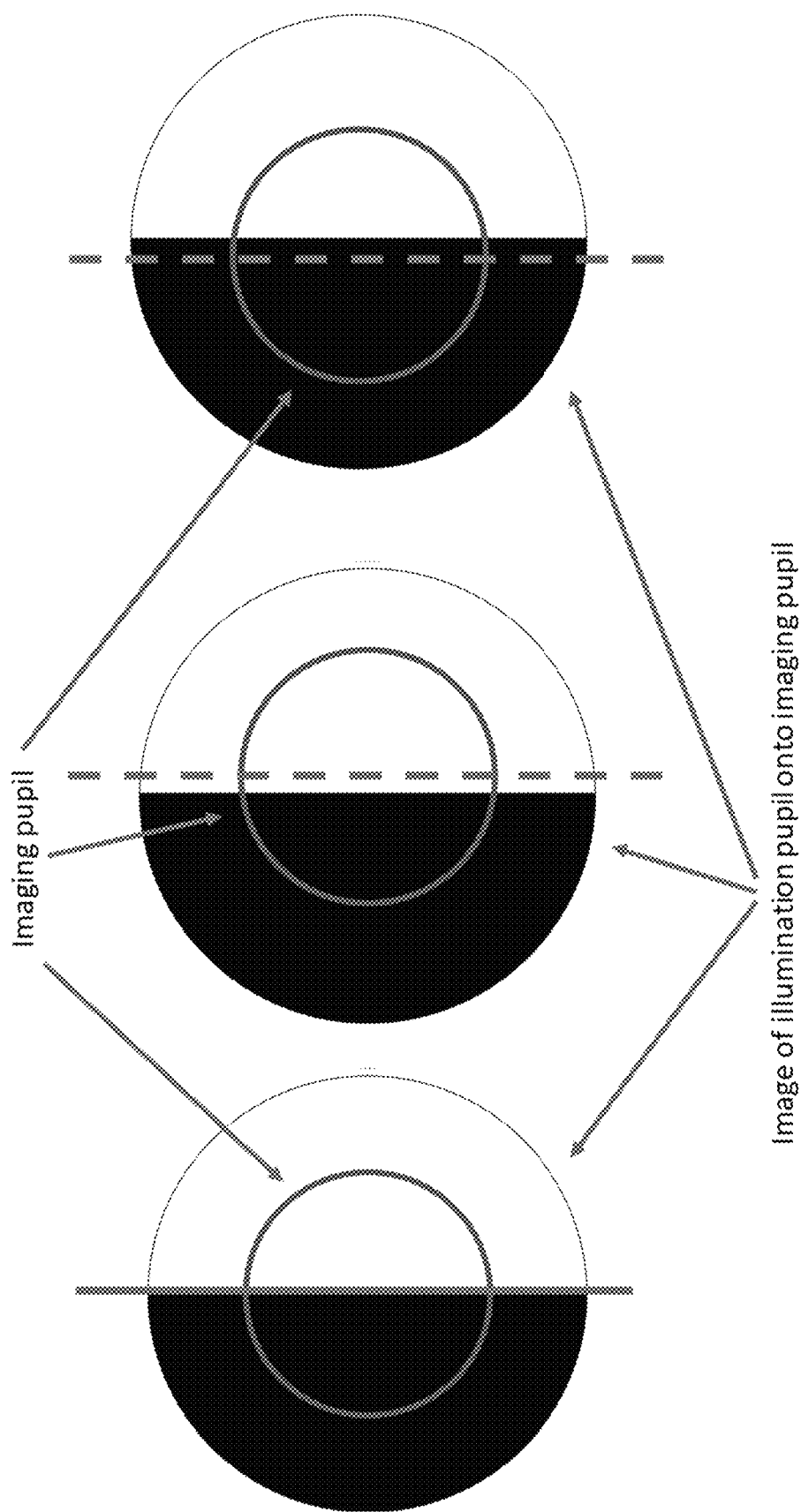
FIG. 8 is a simplified diagram illustrating an illumination-based implementation in accordance with an embodiment.

FIG. 8 is a simplified diagram illustrating an illumination-based implementation in accordance with an embodiment. In this arrangement, an illumination pupil may be partially blocked so that light from only part of the pupil illuminates the sample. In a properly designed imaging system, the illumination pupil is imaged onto the imaging pupil. It follows that if the sample does not have any regions of localized tilt, an image of the illumination pupil is a partially blocked image. If, however, the sample does possess regions of localized tilt, the image is shifted in the lateral direction, thus resulting in either an increase or a decrease in light that passes through the imaging pupil. Hence, the system is capable of distinguishing positive and negative slope.

Figure 9A:
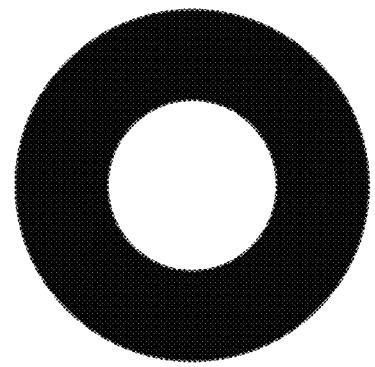
FIGS. 9A-9B are simplified diagrams of a dark field implementation in accordance with an embodiment.
Figure 9B:
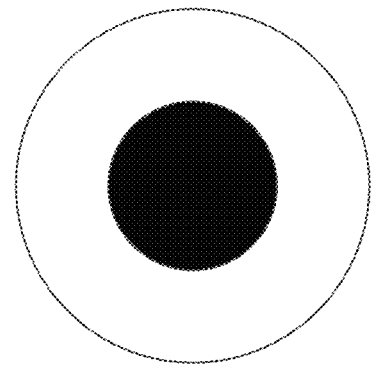

FIGS. 9A-9B show a dark field implementation in accordance with an embodiment. In this arrangement, a portion of an illumination NA is blocked at an imaging pupil (black portions are blocked). For flat areas on a sample, all or nearly all of the reflected light is blocked at the imaging pupil (or at an aperture plane). For tilted regions on a sample, the reflected light will be shifted and thus at least a portion will not be blocked at the imaging pupil, so that in this arrangement, tilted regions will have an increase in measured reflectance intensity.

Figure 10A:
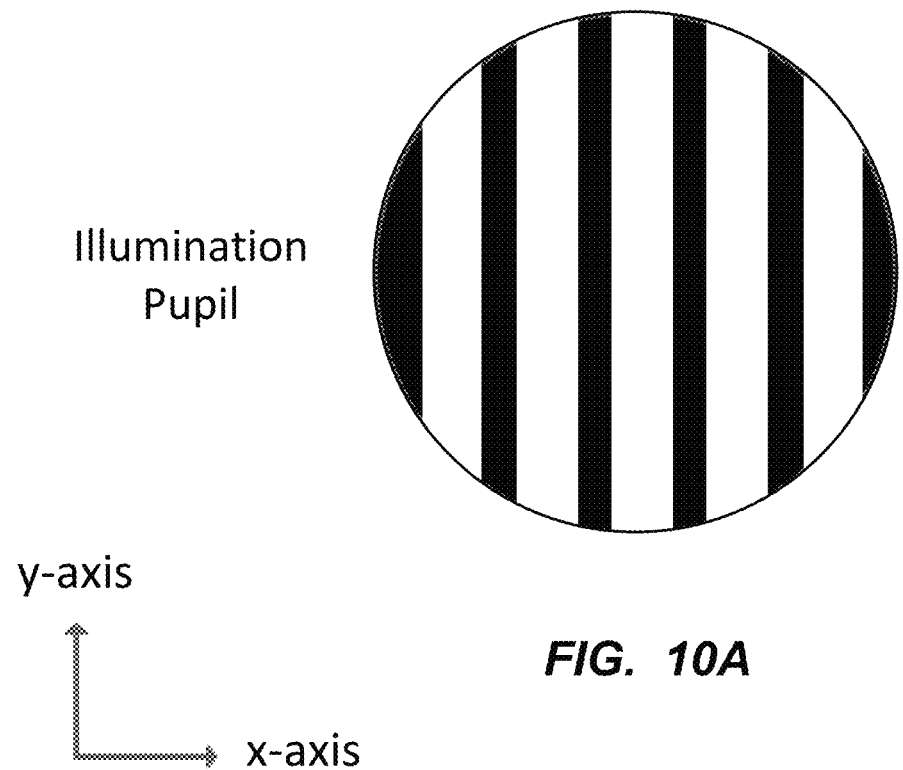
FIGS. 10A-10B are simplified diagrams of a dark field implementation in accordance with another embodiment.
Figure 10B:
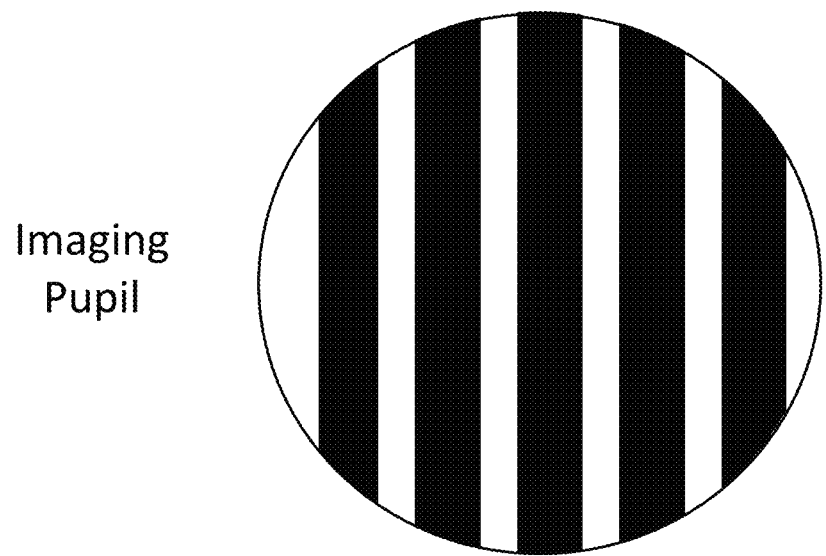

FIGS. 10A-10B illustrate measurement of a two-dimensional surface profile with a one-dimensional pupil pattern in accordance with an embodiment. The pattern used in these figures is merely an example, and other patterns may be used with other embodiments. As shown in FIGS. 10A-10B, a pattern at the illumination pupil may be opposite to the pattern at the imaging pupil for a dark field implementation. The pattern can provide sensitivity to local tilt extending along a particular direction. For example, the pattern used in FIGS. 10A-10B is sensitive to local tilt extending along the x-axis but is not sensitive to local tilt extending along the y-axis (light shifted along the y-axis is not detected with the dark field implementation). In accordance with an embodiment, the patterns are rotatable so that areas of local tilt extending in different directions can be detected separately.

In some embodiments the patterns can also be implemented using an LED array for illumination and/or an LCD array for detection. Patterns for illumination and imaging can be generated by electronic control and/or mechanical patterns.

Figure 11:
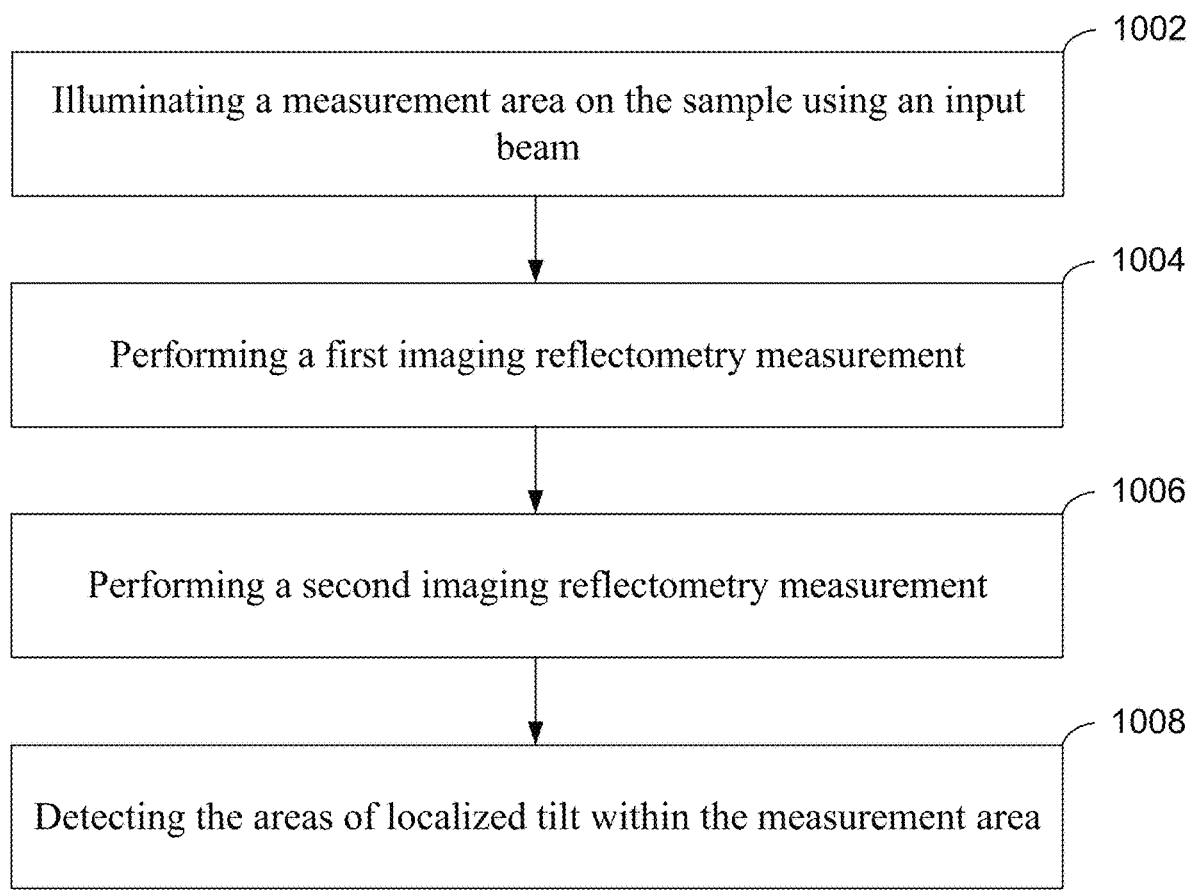
FIGS. 11-12 are flowcharts illustrating methods for detecting areas of localized tilt on a sample using an imaging reflectometer in accordance with some embodiments.

FIG. 11 is a flowchart illustrating a method for detecting areas of localized tilt on a sample using an imaging reflectometer in accordance with an embodiment. The method includes illuminating a measurement area on the sample using an input beam (1002).

The method also includes performing a first imaging reflectometry measurement (1004). Performing the first imaging reflectometry measurement may comprise receiving, at an imaging sensor, a first imaging beam reflected from the sample. An iris positioned at an aperture plane of the imaging reflectometer may be configured so that the first imaging beam passes through a pupil of the iris and the iris does not block any portion of a first beam reflected from the sample. A first image of the measurement area may be obtained using the first imaging beam reflected from the sample and received at the imaging sensor. In some embodiments, a size of the pupil of the iris may be variable.

The method also includes performing a second imaging reflectometry measurement (1006). Performing the second imaging reflectometry measurement may comprise receiving, at the imaging sensor, a second imaging beam reflected from the sample. The iris positioned at the aperture plane of the imaging reflectometer may be configured so that the second imaging beam passes through the pupil of the iris and the iris blocks a portion of a second beam reflected from the sample. A second image of the measurement area may be obtained using the second imaging beam reflected from the sample and received at the imaging sensor. In some embodiments, a diameter of the pupil of the iris may be smaller during the second imaging reflectometry measurement than during the first imaging reflectometry measurement.

The method also includes detecting the areas of localized tilt within the measurement area (1008). Detecting the areas of localized tilt may comprise comparing first reflectance intensity values of pixels in the first image with second reflectance intensity values of corresponding pixels in the second image. In some embodiments, detecting the areas of localized tilt may include identifying pixels in the first image where the first reflectance intensity values are different from the second reflectance intensity values of corresponding pixels in the second image by more than a predetermined amount. In other embodiments, detecting the areas of localized tilt may include comparing, for each of the first plurality of pixels and each of the second plurality of pixels, a first reflectance intensity value of a pixel in the first image with a second reflectance intensity value of a corresponding pixel in the second image.

Comparing the first reflectance intensity values of the pixels in the first image with the second reflectance intensity values of the corresponding pixels in the second image may include dividing the second reflectance intensity values of the pixels in the second image by the first reflectance intensity values of the corresponding pixels in the first image.

A difference in height between an area of localized tilt and surrounding flat areas on the sample may be determined based on a difference in reflectance intensity values between pixels in the first image and corresponding pixels in the second image.

The method of FIG. 11 may also include determining a direction of tilt associated with the areas of localized tilt by arranging a knife edge to block a first portion of the first imaging beam reflected from the sample and a second portion of the second imaging beam reflected from the sample. Regions within the areas of localized tilt may be identified where the direction of tilt is orthogonal to the knife edge based on a change in reflectance intensity values between the first image and the second image.

In accordance with some embodiments, methods for detecting areas of localized tilt on a sample using an imaging reflectometer include performing first and second imaging reflectometry measurements using an arrangement where a pupil of an iris is offset laterally relative to a first beam reflected from the sample. Because the pupil is offset, a portion of an imaging beam passes through the pupil of the iris and a portion of the imaging beam is blocked at the iris. Using an offset pupil allows areas of positive slope and areas of negative slope to be identified within the areas of localized tilt.

Figure 12:
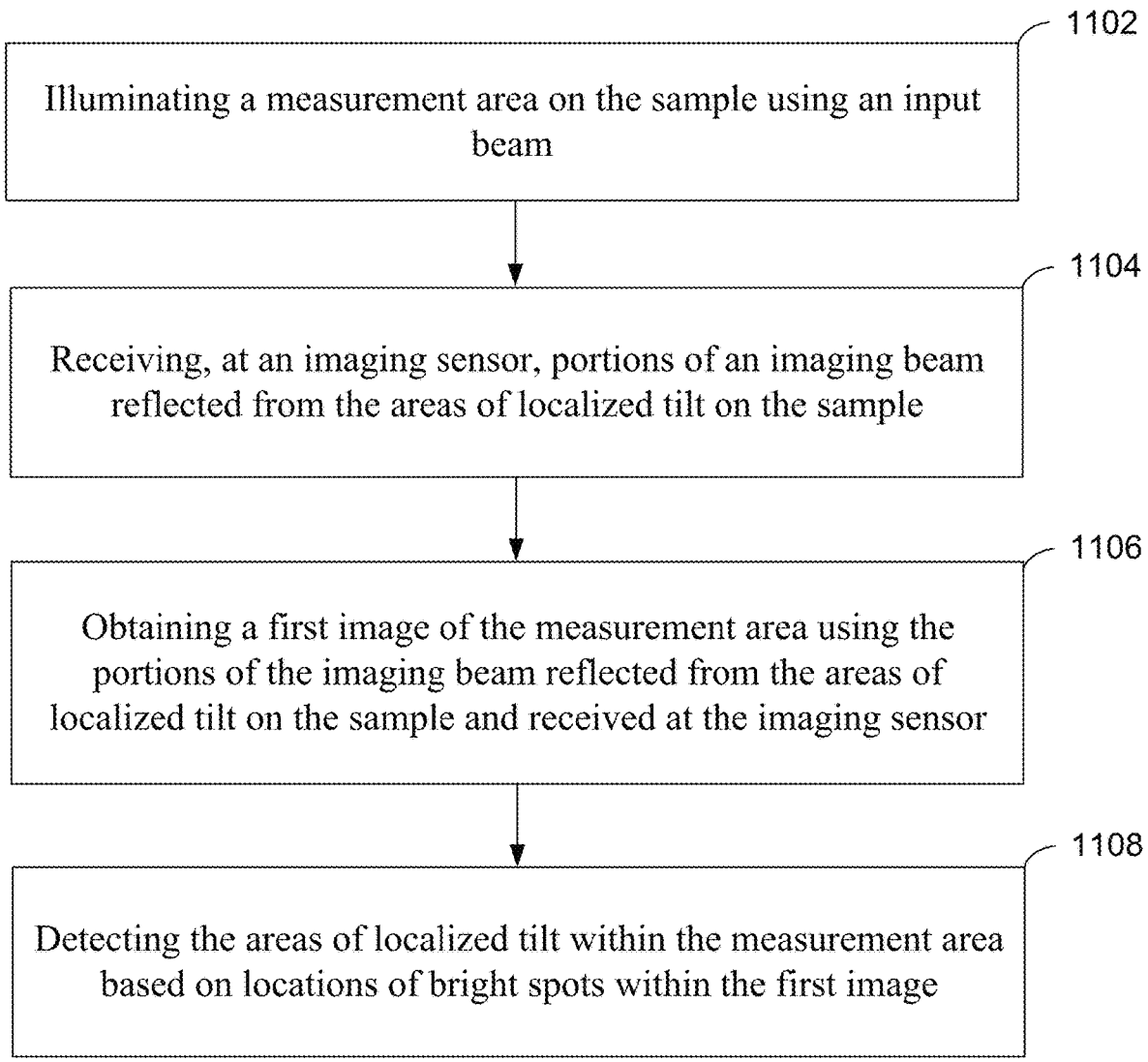

FIG. 12 is a flowchart illustrating a method for detecting areas of localized tilt on a sample using an imaging reflectometer configured for dark field measurements in accordance with an embodiment. The method includes illuminating a measurement area on the sample using an input beam (1102).

The method also includes receiving, at an imaging sensor, portions of an imaging beam reflected from the areas of localized tilt on the sample (1104). The portions of the imaging beam reflected from the areas of localized tilt may pass through an imaging pupil that is configured to block portions of an imaging beam reflected from flat areas on the sample. In some embodiments, a portion of the input beam may pass through an illumination pupil that has a first NA. The imaging pupil may have a second NA that is larger than the first NA.

The method also includes obtaining a first image of the measurement area using the portions of the imaging beam reflected from the areas of localized tilt on the sample and received at the imaging sensor (1106).

The method also includes detecting the areas of localized tilt within the measurement area based on locations of bright spots within the first image (1108).

In some embodiments, a one-dimensional pattern may be provided at the illumination pupil and a one-dimensional pattern may be provided at the imaging pupil. The one-dimensional pattern at the illumination pupil may be an inverse of the one-dimensional pattern at the imaging pupil. An orientation of the one-dimensional pattern at the illumination pupil may be aligned with the orientation of the one-dimensional pattern at the imaging pupil. A direction of tilt associated with the areas of localized tilt may be determined by rotating the one-dimensional pattern at the illumination pupil and the one-dimensional pattern at the imaging pupil by about 90°, obtaining a second image of the measurement area using the portions of the imaging beam reflected from the areas of localized tilt on the sample and received at the imaging sensor, and determining the direction of tilt associated with the areas of localized tilt based on a change in reflectance intensity values between the first image and the second image. In some embodiments, the one-dimensional pattern at the illumination pupil and/or the one-dimensional pattern at the imaging pupil may be generated by electronic control, and rotation of the one-dimen-

What is claimed is:

1. A method for detecting areas of localized tilt on a sample using an imaging reflectometer configured for dark field measurements, the method comprising:
   illuminating a measurement area on the sample using an input beam, a portion of the input beam passing through an illumination pupil;
   receiving, at an imaging sensor, portions of an imaging beam reflected from the areas of localized tilt on the sample, the portions of the imaging beam reflected from the areas of localized tilt passing through an imaging pupil, wherein the imaging pupil is configured to block portions of an imaging beam reflected from flat areas on the sample;
   obtaining a first image of the measurement area using the portions of the imaging beam reflected from the areas of localized tilt on the sample and received at the imaging sensor; and
   detecting the areas of localized tilt within the measurement area based on locations of bright spots within the first image.

2. The method of claim 1 wherein the illumination pupil has a first numerical aperture (NA), and the imaging pupil has a second NA larger than the first NA.

3. The method of claim 1 wherein a one-dimensional pattern is provided at the illumination pupil and a one-dimensional pattern is provided at the imaging pupil, the one-dimensional pattern at the illumination pupil being an inverse of the one-dimensional pattern at the imaging pupil, and an orientation of the one-dimensional pattern at the illumination pupil being aligned with the orientation of the one-dimensional pattern at the imaging pupil, the method further comprising determining a direction of tilt associated with the areas of localized tilt, wherein determining the direction of tilt comprises:
   rotating the one-dimensional pattern at the illumination pupil and the one-dimensional pattern at the imaging pupil by about 90°;
   obtaining a second image of the measurement area using the portions of the imaging beam reflected from the areas of localized tilt on the sample and received at the imaging sensor; and
   determining the direction of tilt associated with the areas of localized tilt based on a change in reflectance intensity values between the first image and the second image.

4. The method of claim 3 wherein the one-dimensional pattern at the illumination pupil and/or the one-dimensional pattern at the imaging pupil is generated by electronic control, and rotation of the one-dimensional pattern at the illumination pupil and/or the one-dimensional pattern at the imaging pupil is provided by electronically generating a new one-dimensional pattern rather than by rotating a mechanical pattern generator.

* * * * *